(12) United States Patent
Carrus et al.

(10) Patent No.: US 6,740,396 B2
(45) Date of Patent: May 25, 2004

(54) CABLE WITH COATING OF A COMPOSITE MATERIAL

(75) Inventors: Antonio Carrus, Cormano (IT); Antonio Zaopo, Milan (IT)

(73) Assignee: Pirelli Cavi e Sistemi S.p.A., Milan (IT)

(*) Notice: Subject to any disclaimer, the term of this patent is extended or adjusted under 35 U.S.C. 154(b) by 35 days.

(21) Appl. No.: 10/082,225

(22) Filed: Feb. 26, 2002

(65) Prior Publication Data
US 2003/0008158 A1 Jan. 9, 2003

Related U.S. Application Data
(60) Provisional application No. 60/272,309, filed on Mar. 2, 2001.

(30) Foreign Application Priority Data
Feb. 26, 2001 (EP) .............................. 01104694

(51) Int. Cl.⁷ .................... B32B 5/16; B32B 15/08
(52) U.S. Cl. .............. 428/331; 428/379; 428/380; 428/458; 428/461; 428/463
(58) Field of Search ....................... 428/458, 331, 428/461, 463, 379, 380

(56) References Cited

U.S. PATENT DOCUMENTS

| | | | |
|---|---|---|---|
| 4,136,103 A | 1/1979 | Oswald | 260/448 |
| 5,747,560 A | 5/1998 | Christiani et al. | 523/209 |
| 5,952,093 A | 9/1999 | Nichols et al. | 428/323 |

FOREIGN PATENT DOCUMENTS

| | | |
|---|---|---|
| EP | 1 033 724 | 9/2000 |
| EP | 1 052 534 | 11/2000 |
| GB | 2 113 453 | 8/1983 |
| JP | 2000-329977 | * 11/2000 |
| WO | WO 98/52197 | 11/1998 |

OTHER PUBLICATIONS

Rogers et al.; "Permeability of Plastic Films and Coated Papers to Gases and Vapors"; Technical Association of the Pulp and Paper Industry Ed., New York, Part 1, pp. 1–11, (1962).

* cited by examiner

Primary Examiner—Monique R. Jackson
(74) Attorney, Agent, or Firm—Finnegan, Henderson, Farabow, Garrett & Dunner, L.L.P.

(57) ABSTRACT

A cable comprising at least one conductor and at least one coating layer based on a composite material comprising:
  at least one polymer containing a predetermined quantity of polar groups; and
  at least one inorganic material with lamellar structure surface-treated with a predetermined quantity of a compatibilizer;
in which said predetermined quantity of polar groups and said predetermined quantity of compatibilizer are selected in such a way that said inorganic material exhibits, in the composite material, a d-spacing value in X-ray diffraction analysis at least 20% higher with respect to the d-spacing value of the inorganic material as such.

41 Claims, 3 Drawing Sheets

CABLE WITH COATING OF A COMPOSITE MATERIAL

CROSS REFERENCE TO RELATED APPLICATIONS

This application claims the benefit of U.S. Provisional Application No. 60/272,309, filed Mar. 2, 2001, the content of which is incorporated herein by reference, and claims the right to priority based on European Application No. 01104694.3, filed Feb. 26, 2001.

BACKGROUND OF THE INVENTION

1. Field of the Invention

The present invention relates to a cable with coating of a composite material.

More particularly, the present invention relates to a cable, in particular for the transmission or distribution of low-voltage or medium-voltage power, which has a coating layer consisting of a composite material that possesses high mechanical, thermal, electrical and barrier properties (very low permeability to water, to solvents and to gases) and fire resistance.

Said cable permits, in particular, the use of high operating temperatures.

2. Description of the Related Art

It is now a requirement in the power and telecommunication cables sector, to find materials that can be used for making coatings that surround the conductor that are able to improve the properties enumerated above.

For this purpose, for example, the addition of mineral fillers to the polymer matrix constituting the coatings that surround the conductor is known, said fillers imparting semiconducting properties to said coatings, for example carbon black and the like; or various types of mineral fillers that are able to impart fireproofing properties to said coatings, for example calcined kaolin, calcium carbonate, magnesium hydroxide, aluminium hydroxide and the like.

Patent application GB 2,113,453 describes an electric cable comprising one or more conductors, a semiconducting screen, a semiconducting layer, an insulating layer, a metallic screen and a sheath. A material that is able to absorb water and so to reduce "water-treeing", comprising an uncoated montmorillonite, is interposed between the semiconducting layer and the sheath. Instead of the montmorillonite it is possible to use molecular sieves as such or mixed with said montmorillonite. Preferably, said material that is able to absorb water is mixed with an organic carrier so as to form an extrudable mixture or a paste. The carrier can be a viscous organic fluid or a semisolid rubber, for example unvulcanized or depolymerized butyl rubber or polyisobutylene.

Patent application EP 1,033,724 describes an electric cable having at least one coating consisting of a material comprising an organic compound, in particular a polymer, and an inorganic material with lamellar structure. The polymer can be selected from: polyolefins (for example, polyethylene or polypropylene), polybutylene terephthalate, vinyl polymers, elastomers, which may be halogenated, thermoplastic elastomers, silicones, copolymers of ethylene, or their mixtures. Among the copolymers of ethylene, the following can be used: ethylene/vinyl acetate copolymer, ethylene/propylene copolymer, ethylene/ethyl acrylate copolymer, ethylene/methyl acrylate copolymer, ethylene/acrylic acid copolymer, terpolymers of ethylene, polymers of ethylene functionalized with groups such as, for example, acids, epoxides, etc. In some cases it is also possible to use epoxy resins, polyesters, polyamides, polyurethanes, silicones, or their mixtures. A graphite or an inorganic oxide can be used as the inorganic material with lamellar structure. Preferably, the organic oxide is a silicate, in particular an aluminosilicate, for example a natural or artificial clay. Among the clays, it is possible to use, for example, kaolin, smectite, montmorillonite, bentonite, and the like. Said inorganic compound with lamellar structure is treated with a compatibilizing agent, which can be a quaternary ammonium salt, a polyethylene oxide, a phosphorus derivative, etc.

SUMMARY OF THE INVENTION

The Applicant has found, however, that the use of the aforesaid material comprising a polymer and an inorganic material with lamellar structure does not always endow the cable with improved properties. In particular, the Applicant has found that, for the purpose of obtaining a cable that possesses improved properties, the polymer and the inorganic material with lamellar structure must be combined in a suitable manner.

The Applicant has now found that it is possible to improve said properties by making a cable that is provided with at least one coating of composite material, said composite material being obtained by intercalation of a polymer containing a predetermined quantity of polar groups, in an inorganic material with lamellar structure surface-treated with a predetermined quantity of a compatibilizer. The Applicant has found that said intercalation only occurs when using a polymer and an inorganic material with lamellar structure that are mutually compatible. More particularly, achievement of a sufficient degree of intercalation depends essentially on the correct combination of the quantity of polar groups present in the polymer and the quantity of compatibilizer present in the inorganic material with lamellar structure. Once intercalation of the polymer has occurred, with consequent exfoliation of the inorganic material with lamellar structure, a composite material is obtained in which said inorganic material is distributed homogeneously in the polymer and has a particle size of the order of a nanometre. On the other hand, if a polymer and an inorganic material with lamellar structure are selected that are not compatible, the aforesaid intercalation/exfoliation does not occur, and a simple mixture between the two components (polymer/inorganic material with lamellar structure) is thus obtained, in which mixture the particles of said inorganic material still have their initial dimensions (of the order of microns). For equal final performance of the cable, when intercalation occurs it is possible to use a smaller quantity of inorganic material with lamellar structure, with respect to the quantity used in the case when intercalation does not occur.

In a first aspect, the present invention therefore relates to a cable comprising at least one conductor and at least one coating layer consisting of a composite material comprising:

- at least one polymer containing a predetermined quantity of polar groups; and
- at least one inorganic material with lamellar structure, surface-treated with a predetermined quantity of a compatibilizer;

in which said predetermined quantity of polar groups and said predetermined quantity of compatibilizer are such that said inorganic material exhibits, in the composite material, a d-spacing value in X-ray diffraction analysis at least 20% higher, preferably at least 30% higher, with respect to the d-spacing value of the inorganic material as such.

In the present description and in the subsequent claims, the term "conductor" means a conducting element as such, of elongated shape and preferably of a metallic material, or a conducting element coated with a semiconducting layer.

In a second aspect the present invention relates to a composite material comprising:

- at least one polymer containing a predetermined quantity of polar groups; and
- at least one inorganic material with lamellar structure, surface-treated with a predetermined quantity of a compatibilizer;

in which said predetermined quantity of polar groups and said predetermined quantity of compatibilizer are such that said inorganic material exhibits, in the composite material, a d-spacing value in X-ray diffraction analysis at least 20% higher, preferably at least 30% higher, with respect to the d-spacing value of the inorganic material as such.

In a further aspect, the present invention relates to the use of a composite material as defined above as a base material for the preparation of a coating layer with properties of electrical insulation, or for the preparation of a coating layer with semiconducting properties, or for the preparation of a coating layer with the function of external protective sheath.

The polymer containing polar groups is generally selected from polymers functionalized with polar groups selected from: hydroxyl groups, carboxyl groups, epoxide groups, anhydride groups, silane groups.

Said polar groups can be introduced into the polymer during the production of the polymer itself, by copolymerization with corresponding functionalized monomers containing at least one ethylenic unsaturation; or by subsequent modification of the polymer by grafting-on of the aforesaid functionalized monomers in the presence of a radical initiator (in particular an organic peroxide).

Alternatively, it is possible to introduce the polar groups by reaction of groups already present on the polymer with a suitable reagent such as, for example, by an epoxidation reaction of a diene polymer containing double bonds along the main chain and/or side groups with a peracid (for example, m-chloroperbenzoic acid or peracetic acid) or with hydrogen peroxide in the presence of a carboxylic acid or a derivative of a carboxylic acid; or by a hydrolysis reaction of groups already present on the polymer, such as, for example, by a hydrolysis reaction of vinyl acetate groups.

Examples of epoxides containing an ethylenic unsaturation that can be used for this purpose are: glycidyl acrylate, glycidyl methacrylate, monodiglycidyl ester of itaconic acid, glycidyl ester of maleic acid, vinylglycidyl ether, allylglycidyl ether, or their mixtures.

Examples of monocarboxylic or dicarboxylic acids having at least one ethylenic unsaturation, or their derivatives, that can be used for this purpose are: maleic acid, maleic anhydride, fumaric acid, citraconic acid, itaconic acid, acrylic acid, methacrylic acid or their mixtures and the anhydrides or esters derived from them or their mixtures. Maleic anhydride is particularly preferred.

Examples of silane compounds that can be used for this purpose are: γ-methacryloxypropyltrimethoxysilane, methyltriethoxysilane, methyltris-(2-methoxyethoxy)silane, dimethyldiethoxysilane, vinyltris-(2-methoxyethoxy)silane, vinyltrimethoxysilane, vinyltriethoxysilane, octyltriethoxysilane, isobutyltriethoxysilane, isobutyltrimethoxysilane, or their mixtures.

Examples of polymers functionalized with the polar groups described above are: polyolefins functionalized with polar groups such as, for example, polypropylene or polyethylene grafted with maleic anhydride; ethylene-vinyl acetate (EVA) copolymers; ethylene-ethyl acrylate (EEA) copolymers; ethylene-methyl acrylate (EMA) copolymers; ethylene-acrylic acid copolymers; polymethyl methacrylate (PMMA).

Alternatively, the polymer containing polar groups can be selected from: polymers containing amide groups such as polyamides, for example nylon 6; halogenated polymers such as, for example, polyvinylchloride; elastomers functionalized with the polar groups described above such as, for example, epoxidized natural rubber (ENR), natural rubber functionalized with acrylic or methacrylic groups; halogenated elastomers such as, for example, polyethylenechlorosulphonate (CSP), chlorinated polyethylene (CPE), said halogenated elastomers optionally containing hetero atoms such as, for example, oxygen, nitrogen, sulphur; elastomeric copolyesters obtained by transesterification of terephthalic anhydride with a mixture of diols such as, for example, Hytrel® from DuPont; acrylates such as, for example, polyacrylates.

For the purpose of the present invention, the polymer containing a predetermined quantity of polar groups can be selected from polymers of low polarity having a content of hetero atoms of between 0.5% and 7% by weight with respect to the weight of the polymer; or from polymers of medium polarity having a content of hetero atoms of between 7% and 32% by weight; or from polymers of high polarity having a content of hetero atoms of between 32% and 50% by weight.

Within the framework of the present description and the claims, the term "hetero atoms" means atoms different from carbon and hydrogen, and in particular it means atoms of oxygen, nitrogen, sulphur, chlorine or bromine.

Examples of said polymers of low polarity are: polyolefins functionalized with polar groups such as, for example, polypropylene or polyethylene grafted with maleic anhydride; ethylene-vinyl acetate (EVA) copolymers having a content of vinyl acetate between 2% and 18% by weight; ethylene-ethyl acrylate (EEA) copolymers having a content of ethyl acrylate between 2% and 18% by weight; ethylene-methyl acrylate (EMA) copolymers having a content of methyl acrylate between 2% and 21% by weight; ethylene-acrylic acid copolymers; epoxidized natural rubber (ENR), natural rubber functionalized with acrylic or methacrylic groups.

Examples of said polymers of medium polarity are: ethylene-vinyl acetate (EVA) copolymers having a content of vinyl acetate of between 18% and 80% by weight; ethylene-ethyl acrylate (EEA) copolymers having a content of ethyl acrylate of between 18% and 80% by weight; ethylene-methyl acrylate (EMA) copolymers having a content of methyl acrylate of between 21% and 80% by weight; polymethyl methacrylate (PMMA); polyesters such as, for example, polybutylene terephthalate (PBT), polyethylene terephthalate (PET); elastomeric copolyesters obtained by transesterification of terephthalic anhydride with a mixture of diols; halogenated elastomers such as, for example, polyethylene chlorosulphonate (CSP), chlorinated polyethylene (CPE), said halogenated elastomers possibly containing hetero atoms such as, for example, oxygen, nitrogen, sulphur; acrylates such as, for example polyacrylates.

Examples of said polymers of high polarity are: ethylene-vinyl acetate (EVA) copolymers having a content of vinyl acetate greater than 80% by weight; ethylene-ethyl acrylate (EEA) copolymers having a content of ethyl acrylate greater than 80% by weight; ethylene-methyl acrylate copolymers having a content of methyl acrylate greater than 80% by weight; polyvinyl acetate; polyethyl acrylate; polymethyl acrylate; polyvinyl chloride (PVC).

Examples of polymers containing polar groups that can be used in the present invention and are available commercially are: Escorene® Ultra UL00119 from Exxon Chemical; Vestodur® 300 from Hüls; Elvax® 40L03 from DuPont; Hytrel® from DuPont, Orevac® from Atofina.

The inorganic material with lamellar structure can be selected from phyllosilicates, such as: smectites, for example montmorillonite, nontronite, beidellite, volkonskoite, hectorite, saponite, sauconite; vermiculite; halloisite; sericite; or their mixtures. Montmorillonite is particularly preferred.

The compatibilizer can be selected from the quaternary ammonium or phosphonium salts having general formula (I):

in which:

Y represents N or P;

$R_1$, $R_2$, $R_3$ and $R_4$, which may be identical or different, represent a linear or branched $C_1$–$C_{20}$ alkyl or hydroxyalkyl group; a linear or branched $C_1$–$C_{20}$ alkenyl or hydroxyalkenyl group; a group —$R_5$—SH or —$R_5$—NH in which $R_5$ represents a linear or branched $C_1$–$C_{20}$ alkylene group; a $C_6$–$C_{18}$ aryl group; a $C_7$–$C_{20}$ arylalkyl or alkylaryl group; a $C_5$–$C_{18}$ cycloalkyl group, said cycloalkyl group possibly containing a hetero atom such as oxygen, nitrogen or sulphur;

$X^{n-}$ represents an anion such as the chloride ion, the sulphate ion or the phosphate ion;

n represents 1, 2 or 3.

The inorganic material with lamellar structure can be selected from the inorganic materials with lamellar structure of low polarity obtained by surface treatment with a predetermined quantity of a compatibilizer having general formula (I) in which at least two of the substituents $R_1$, $R_2$, $R_3$ and $R_4$, represent a linear or branched $C_4$–$C_{20}$ alkyl group, preferably $C_{18}$, said quantity being between 125 meq and 200 meq per 100 g of inorganic material with lamellar structure.

Alternatively, the inorganic material with lamellar structure can be selected from the inorganic materials with lamellar structure of medium polarity obtained by surface treatment with a predetermined quantity of a compatibilizer having general formula (I) in which at least one of the substituents $R_1$, $R_2$, $R_3$ and $R_4$, represents a linear or branched $C_4$–$C_{20}$ alkyl or hydroxyalkyl group, or a group —$R_5$—SH or —$R_5$—NH in which $R_5$ represents a linear or branched $C_4$–$C_{20}$ alkylene group, said quantity being between 95 meq and 125 meq per 100 g of inorganic material with lamellar structure.

Alternatively, the inorganic material with lamellar structure can be selected from the inorganic materials with lamellar structure of high polarity obtained by surface treatment with a predetermined quantity of a compatibilizer having general formula (I) in which at least one of the substituents $R_1$, $R_2$, $R_3$ and $R_4$, represents a linear or branched $C_4$–$C_{20}$ alkyl or hydroxyalkyl group, or a linear or branched $C_4$–$C_{20}$ alkenyl or hydroxyalkenyl group, or a group —$R_5$—SH or —$R_5$—NH in which $R_5$ represents a linear or branched $C_4$–$C_{20}$ alkylene group, said quantity being between 20 meq and 95 meq per 100 g of inorganic material with lamellar structure.

The surface treatment of the inorganic material with lamellar structure with the compatibilizer can be carried out according to known methods such as, for example, by an ion exchange reaction between the inorganic material with lamellar structure and the compatibilizer: further details are described, for example, in U.S. Pat. No. 4,136,103, U.S. 5,747,560 or U.S. 5,952,093.

According to a preferred embodiment, the composite material comprises:

at least one polymer of low polarity having a content of hetero atoms between 0.5% and 7% by weight; and at least one inorganic material with lamellar structure of low polarity obtained by surface treatment with a predetermined quantity of a compatibilizer having general formula (I) in which at least two of the substituents $R_1$, $R_2$, $R_3$ and $R_4$, represent a linear or branched $C_4$–$C_{20}$ alkyl group, preferably $C_{18}$, said quantity being between 125 meq and 200 meq per 100 g of inorganic material with lamellar structure.

According to another preferred embodiment, the composite material comprises:

at least one polymer of medium polarity having a content of hetero atoms between 7% and 32% by weight; and at least one inorganic material with lamellar structure of medium polarity obtained by surface treatment with a predetermined quantity of a compatibilizer having general formula (I) in which at least one of the substituents $R_1$, $R_2$, $R_3$ and $R_4$, represents a linear or branched $C_4$–$C_{20}$ alkyl or hydroxyalkyl group, or a group —$R_5$—SH or —$R_5$—NH in which $R_5$ represents a linear or branched $C_4$–$C_{20}$ alkylene group, said quantity being between 95 meq and 125 meq per 100 g of inorganic material with lamellar structure.

According to a further preferred embodiment, the composite material comprises:

at least one polymer of high polarity having a content of hetero atoms between 32% and 50% by weight; and at least one inorganic material with lamellar structure of high polarity obtained by surface treatment with a predetermined quantity of a compatibilizer having general formula (I) in which at least one of the substituents $R_1$, $R_2$, $R_3$ and R4, represents a linear or branched $C_4$–$C_{20}$ alkyl or hydroxyalkyl group, or a linear or branched $C_4$–$C_{20}$ alkenyl or hydroxyalkenyl group, or a group —$R_5$—SH or —$R_5$—NH in which $R_5$ represents a linear or branched $C_4$–$C_{20}$ alkylene group, said quantity being between 20 meq and 95 meq per 100 g of inorganic material with lamellar structure.

Examples of inorganic materials with lamellar structure that can be used in the present invention and are available commercially are the products known by the name Cloisite® from Southern Clay Products.

The inorganic material with lamellar structure is added in a quantity between 1 phr and 40 phr, preferably between 4 phr and 20 phr.

Within the present description and the claims that follow, the term "phr" indicates parts by weight of a given ingredient per 100 parts of polymer.

The composite material of the present invention can be produced in accordance with methods known in the art, as described for example in U.S. Pat. No. 5,747,560 or U.S. 5,952,093.

For example, said composite material can be produced by a method comprising the following stages:

heat the polymer containing polar groups to a temperature not below the softening point of said polymer, preferably not below the melting temperature of said polymer;

mix the polymer with said inorganic material with lamellar structure, and bring the mixture up to a temperature not below the softening point of said polymer, preferably not below the melting temperature of said polymer, applying a force sufficient to disaggregate, at least partially, said inorganic material with lamellar structure.

The composite material according to the present invention can be prepared by melt blending, using an extruder, an internal mixer of the type with tangential rotors (Banbury), or in continuous mixers of the Ko-Kneader type (Buss), or co-rotating or counter-rotating twin-screw types (Brabender).

For the production of a coating layer for a cable, other conventional components can be added to the composite material as defined above such as, for example, antioxidants, processing adjuvants, water-tree retardants.

Conventional antioxidants suitable for this purpose are, for example, distearylthiodipropionate, tetrakis[3-(3,5-di-t-butyl-4-hydroxyphenyl)propionyloxymethyl]methane, or their mixtures.

Processing adjuvants that can be added to the composite material are, for example, calcium stearate, zinc stearate, stearic acid, paraffin wax, or their mixtures.

With particular reference to low- and medium-voltage cables, the composite material as defined above can be used advantageously for making a coating layer with properties of electrical insulation. In fact, as described above, said composite material can give high mechanical characteristics both at room temperature and when hot, in particular permitting the use of high operating temperatures.

Coating layers with semiconducting properties of the cable can be produced in accordance with the known art and consist advantageously of a semiconducting polymeric material. Preferably, said material is of the same type as that used for the coating layer with electrical insulation properties, so as to ensure good adhesion and hence avoid detachments that would generate partial discharges and, ultimately, perforation of the cable.

According to a preferred aspect, at least one of the coating layers with semiconducting properties of the cable of the invention comprises a composite material as described above.

In the case when it is intended to make a semiconducting layer, in general a conducting filler is dispersed in the polymeric material, in particular carbon black, in a quantity such as to endow said material with semiconducting characteristics (i.e. so as to obtain a resistivity of less than 5 $\Omega$.m at room temperature). Said quantity is generally between 5% and 80% by weight, preferably between 10% and 50% by weight, with respect to the total weight of the final composition.

According to another preferred aspect, the present invention relates to a cable comprising, in addition to the layers defined above, at least one coating layer with the function of external protective sheath, consisting of the composite material described above.

In accordance with the present invention, the use of the composite material described above makes it possible to obtain cables possessing high mechanical, thermal, electrical and barrier properties (very low permeability to water, solvents and gases) and fire resistance.

In particular, the coating layer with electrical insulation properties, produced using the composite material described above, makes it possible to have relatively high operating temperatures (even 15° C. higher with respect to the conventional materials, for example XLPE). In this way, the mechanical strains are avoided, to which the known materials are generally liable, for example XLPE, which generally constitute the coating layer with electrical insulation properties, when using high operating temperatures.

Within the scope of the present invention, "low voltage" generally means a voltage up to 1 kV, whereas "medium voltage" means a voltage between 1 kV and 35 kV.

Although the present description mainly focuses on the production of cables for the transmission or distribution of low- or medium-voltage electric power, the composite material described above can be used for coating electrical devices in general, and in particular various types of cables, for example high-voltage cables, cables for telecommunications, or even mixed power/telecommunication cables.

BRIEF DECRIPTION OF THE DRAWINGS

Further details will be illustrated in the following, appended drawings, in which.

DETAILED DESCRIPTION OF THE INVENTION

Figure 1:
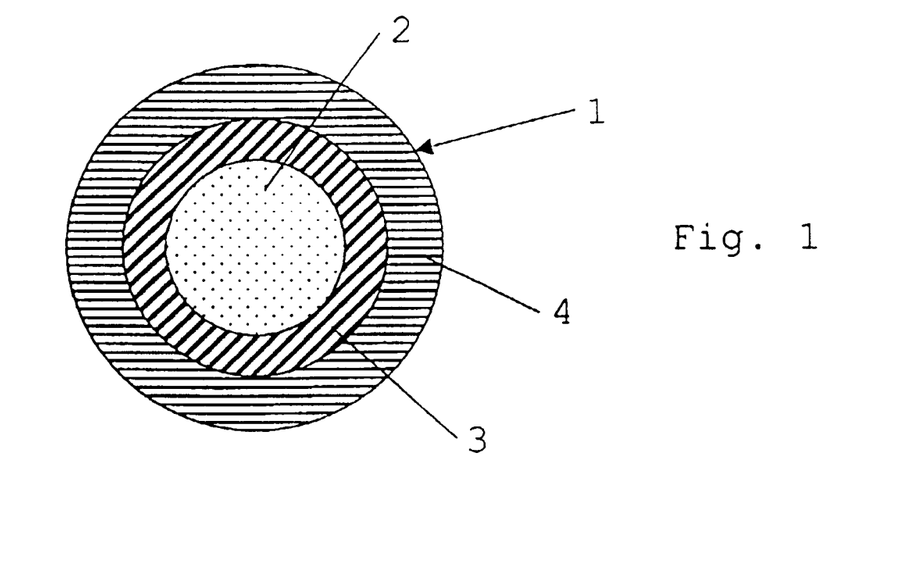
FIG. 1 shows, in cross section, an electric cable of the unipolar type according to one embodiment of the present invention.

Referring to FIG. 1, cable 1 comprises a metallic conductor 2, an internal insulating coating layer 3 and an external layer 4. The internal insulating coating layer 3 or the external layer 4 can comprise, as polymeric base material, the composite material according to the present invention.

Figure 2:
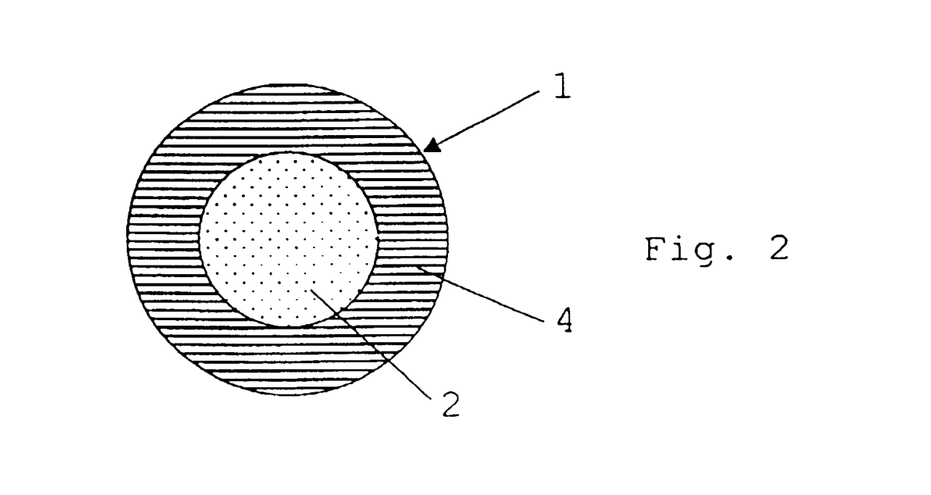
FIG. 2 shows, in cross section, an electric cable of the unipolar type according to another embodiment of the present invention.

Referring to FIG. 2, cable 1 comprises a conductor 2 coated directly by an external layer 4 that can comprise, as polymeric base material, the composite material according to the present invention.

Figure 3:
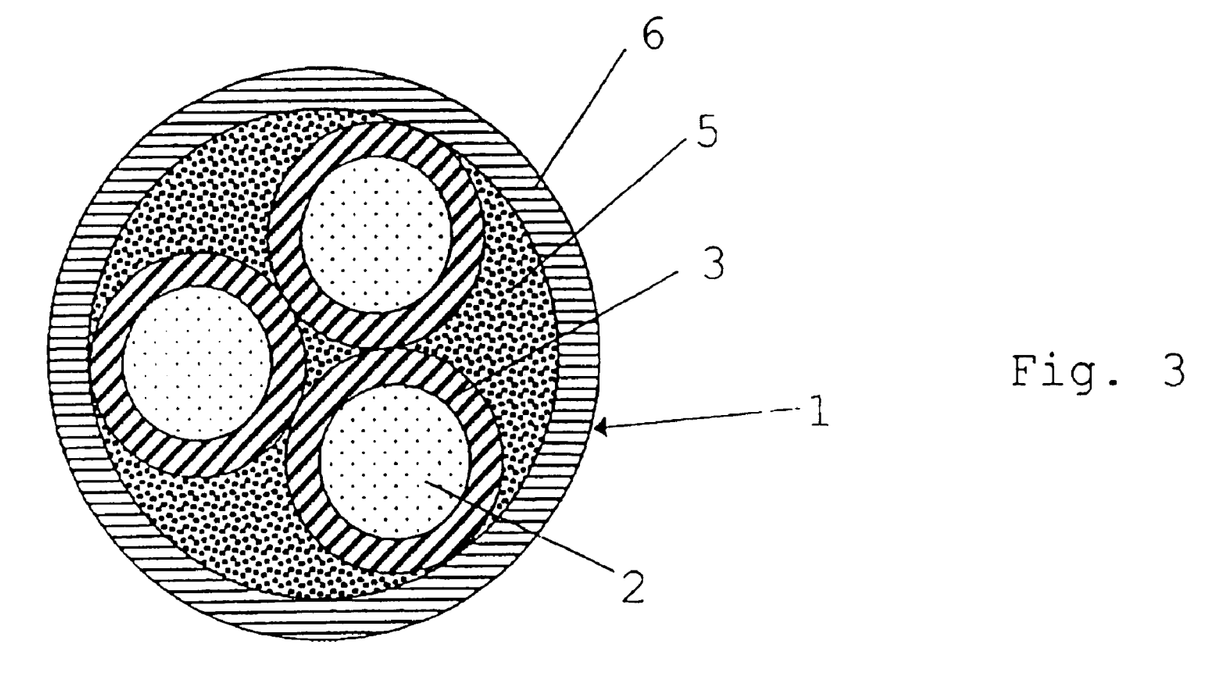
FIG. 3 shows, in cross section, an electric cable of the tripolar type according to a further embodiment of the present invention.

Referring to FIG. 3, cable 1 comprises three conductors 2, each one covered by an insulating coating layer 3 that can comprise, as polymeric base material, the composite material according to the present invention, two of which are phase conductors and a third is a neutral conductor. The conductors 2 thus insulated are wound around one another and the interstices between the insulated conductors 2 are filled with a filler material that forms a continuous structure having a substantially cylindrical shape. The filler material 5 is preferably a flame-retarding material. An outer sheath 6, which can comprise, as polymeric base material, the composite material according to the present invention, is applied, generally by extrusion, to the structure thus obtained.

Figure 4:
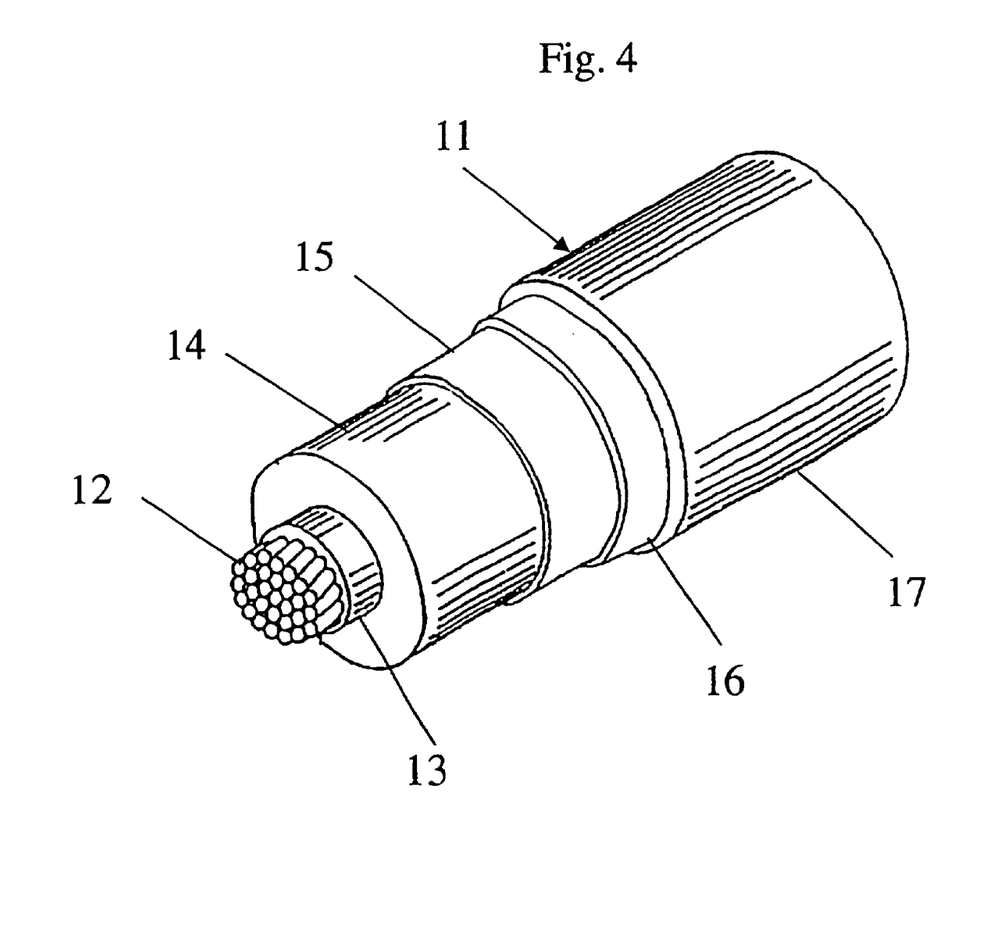
FIG. 4 shows, in perspective view, a length of cable with parts removed in stages, to reveal its structure.

Referring to FIG. 4, cable 11 comprises, in order from the centre outwards: a conductor 12, an internal semiconducting layer 13, an insulating coating layer 14, an external semiconducting layer 15, a metallic screen 16, and an outer sheath 17.

The conductor 12 generally consists of metal wires, preferably of copper or aluminium, stranded together according to conventional techniques. The internal and external semiconducting layers 13 and 15, which can comprise, as polymeric base material, the composite material according to the present invention, are extruded onto conductor 12, separately or simultaneously with the insulating coating layer 14 which can comprise, as polymeric base material, the composite material according to the present invention. A screen 16, generally consisting of electrically conducting wires or tapes, wound spirally, is usually arranged around the external semiconducting layer 15. Said screen is then covered with a sheath 17, consisting of a thermoplastic material, for example uncrosslinked polyethylene (PE), a homopolymer or copolymer of propylene, or the composite material according to the present invention.

The cable can in addition be provided with an outer protective structure (not shown in FIG. 4), which mainly performs the function of mechanical protection of the cable against impact and/or compression. Said protective structure can be, for example, a metallic armour or a layer of expanded polymeric material as described in patent application WO 98/52197.

FIGS. 1, 2, 3 and 4 show just one possible embodiment of a cable according to the present invention: it is obvious that modifications known in the art can be made to this embodiment, while still remaining within the scope of the present invention.

The cable according to the present invention can be made by known techniques for the deposition of layers of thermoplastic material, for example by extrusion. Advantageously, extrusion is effected in a single pass, for example by a "tandem" technique, in which individual extruders are used, arranged in series, or by co-extrusion with a multiple extrusion head.

For the purposes of the present invention, the variations (%) of the d-spacing values in X-ray diffraction analysis have been calculated. The analysis was carried out by inserting the test samples (the samples were obtained in the manner described in the examples given below) in a Philips Xpert diffractometer, employing analysis radiation of the CuK$\alpha$ type. The data were obtained with a step of 0.04°2$\theta$ and a count of 6 seconds per step in the range 1.4°2$\theta$-32.0°2$\theta$. The d-spacing value was calculated using the following formula:

$$d\text{-spacing} = \lambda/2 \sin \theta$$

in which $\lambda$ is the wavelength of the k$\alpha$ radiation of Cu (average of k$\alpha$1 and k$\alpha$2) equal to 1.54178 Å.

The d-spacing value corresponds to the value of the distance between the crystal planes of the composite material according to the present invention, in particular said value is the average distance between the corresponding surfaces of contiguous plates of inorganic material. The effective distance between the continuous plates is obtained by subtracting the thickness of the individual plate (approx. 1 nm) from the d-spacing value.

The present invention is further described in the following examples, which are merely for illustration and must not be regarded in any way as limiting the invention.

EXAMPLE 1

Production of a Composite Material

The composite material was produced by melt blending of:

Escorene® Ultra UL00119 (Exxon Chemical): ethylene-vinyl acetate copolymer containing 19 wt. % of vinyl acetate, 7.1 wt. % of oxygen; and Cloisite® 25A (Southern Clay Products): organo-modified montmorillonite (95 meq/100 g) belonging to the smectite family; in the quantities stated in Table 1.

TABLE 1

| PRODUCT | SAMPLE | | | |
|---|---|---|---|---|
| | (A) | (B) | (C) | (D) |
| ESCORENE ® ULTRA UL00119 | 100 phr | 100 phr | 100 phr | 100 phr |
| CLOISITE ® 25A | — | 5 phr | 10 phr | 20 phr |

Samples (B), (C) and (D) were prepared in a closed Banbury mixer (volume of mixing chamber: 1200 cm$^3$) with a volumetric filling coefficient of about 97%. In a first stage, the mixer was loaded with Escorene® Ultra UL00119, in the quantities stated above, and this was heated to its softening point (80° C.) for a total time of 2 minutes (speed of rotors: 70 rev/min). Next, the Cloisite® 25A was added, in the quantities stated above, and the mixture thus obtained was heated to a temperature of 140° C. for a total time of 5 minutes (speed of rotors: 70 rev/min), the composite material according to the present invention being obtained. Sample (A) (pure polymer) was obtained by mixing, in the Banbury mixer indicated above, at a temperature of 140° C. for a total time of 5 minutes (speed of rotors: 70 rev/min), the Escorene® UL00119 as such, in the quantity indicated above.

Using samples (B) and (C) obtained as described above, thin films with thickness of 100 $\mu$m were prepared by moulding: bringing together for 5 minutes at 140° C., moulding for 5 minutes at 140° C. and 200 bar, cooling for 20 minutes at room temperature.

The films thus obtained were submitted to X-ray diffraction analysis using a Philips Xpert diffractometer and operating as described above. The following d-spacing values were obtained:

Sample (B)=36.9 Å;
Sample (C)=37.1 Å.

These values, when compared with the d-spacing value of Cloisite® 25A in powder form, which was equal to 20.4 Å, show that intercalation of the polymer in the organic material had occurred: in fact, a change in d-spacing value was obtained, equal to 81% for Sample (B) and to 82% for Sample (C).

Mechanical Properties

The samples obtained as described above were submitted to thermomechanical characterization using a DMTA analyser (Dynamic Mechanical Thermal Analyzer of Reometrics Inc.).

For this purpose, using samples (A), (B), (C) and (D), plates with thickness of 0.3 mm were prepared by compression moulding at 140° C. and 200 bar after preheating for 5 minutes at the same temperature. Punched specimens with the following dimensions: 15 mm×6 mm×0.3 mm, were obtained from these plates, and were used for recording the variation in dynamic elastic modulus as a function of temperature. The results obtained are shown in Table 2.

For this purpose, said punched specimens were fixed by clamps at both ends and submitted to tension with sinusoidal variation by means of the guide clamp operating at a frequency of oscillation of 1 Hz and in a temperature range between −60° C. and +90° C. The elongation of the punched specimen is proportional to the current supplied to the vibrator connected to the clamp, whereas the load to which the punched specimen was subjected is proportional to its elongation and was detected by means of a transducer connected to the shaft of the vibrator clamp.

Next, operating as described above, plates were prepared with a thickness of 1 mm, from which punched specimens were obtained possessing the following dimensions: 15 mm×6 mm×1 mm, which were used for determining the elastic modulus at elongation and the elongation at break (according to standard CEI 20-34§1.1) with an Instron instrument and a traction speed of 50 mm/min. The results relating to the elastic modulus at elongation are presented in Table 2.

TABLE 2

| | SAMPLES | | | |
|---|---|---|---|---|
| | (A) | (B) | (C) | (D) |
| DYNAMIC ELASTIC MODULUS | | | | |
| 1000 (MPa) | −25.70° C. | −20.00° C. | −16.10° C. | −7.00° C. |
| 100 (MPa) | +6.79° C. | +31.70° C. | +40.00° C. | +47.00° C. |
| 10 (MPa) | +65.30° C. | +72.00° C. | +77.00° C. | +81.00° C. |
| ELASTIC MODULUS AT ELONGATION (MPa) | | | | |
| 10% | 2.5 | 3.9 | 4.7 | 6.5 |
| 20% | 3.2 | 4.4 | 5.3 | 6.7 |
| 50% | 4.0 | 5.1 | 5.6 | 6.8 |

The above data show that the composite materials according to the present invention are endowed with better mechanical properties. In particular, the data in Table 2 show an increase in the temperature at which the composite material (Samples (B), (C) and (D)) exhibits a given dynamic elastic modulus with respect to the polymer as such (Sample (A)), thus making it possible to produce cables that are able to maintain high mechanical properties even at high operating temperatures. The data presented above also show that the composite material (Samples (B), (C) and (D)) displays an increase in elastic modulus at elongation with respect to the polymer as such (Sample (A)), thus confirming the better mechanical properties of the composite materials according to the present invention.

Elongation at break does not display substantial changes with respect to the polymer as such, being around an elongation of 730%: this shows that the presence of the inorganic material with lamellar structure does not adversely affect the characteristics of the polymer as such.

Measurements of Permeability

Table 3 gives the values of permeability to water vapour according to standard ASTM E96, measured at room temperature on plates with thickness of 200 μm obtained by compression moulding at 140° C. and 200 bar after preheating for 5 minutes at the same temperature.

TABLE 3

| | SAMPLES | | | |
|---|---|---|---|---|
| | (A) | (B) | (C) | (D) |
| PERMEABILITY g/(cm · h · mm Hg) | 3.91 · $10^{-8}$ | 2.35 · $10^{-8}$ | 1.76 · $10^{-8}$ | 1.22 · $10^{-8}$ |

The data given above show that the composite material according to the present invention is endowed with better barrier properties. In particular, the data in Table 3 show a decrease in permeability to water vapour of approx. 40% of sample (B) (containing 5 phr of Cloisite® 25A) with respect to the polymer as such (sample (A)).

Measurements of Oxygen Index (LOI)

The oxygen index (LOI) was determined in accordance with standard CEI 20-22/4.

For this purpose, using samples (A), (B), (C) and (D), plates were prepared as described above having a thickness of 3 mm, and punched specimens were obtained from these, with the following dimensions: 100 mm×6.5 mm×3 mm.

These punched specimens were placed in a glass bell containing a percentage of oxygen that can be varied at will. The oxygen index is defined as the lower concentration of oxygen at which:

the punched specimen burns for 3 minutes;

within 3 minutes, combustion of a length of 50 mm of the punched specimen is observed.

Once the percentage of oxygen in the bell containing the sample was fixed, a burner was brought close to the upper end of the punched specimen and was taken away after 30 seconds. With the burner removed, the combustion of the punched specimen was observed and timed. The following data were obtained:

the punched specimen obtained from sample (A) has an oxygen index equal to 20;

the punched specimens obtained from samples (B), (C) and (D) have an oxygen index equal to 22.

It was further observed that, working with oxygen percentages above 22%, there is a slowing of flame propagation along the punched specimens obtained from the composite material according to the present invention. The following data were obtained:

the punched specimen obtained from sample (A) burned completely in 1 minute and 45 seconds;

the punched specimen obtained from sample (B) burned completely in 7 minutes and 40 seconds;

the punched specimen obtained from sample (C) burned completely in 8 minutes and 10 seconds;

the punched specimen obtained from sample (D) burned completely in 9 minutes and 30 seconds.

Furthermore, the punched specimen obtained from sample (A) exhibited considerable dripping, but this was not encountered with the punched specimens obtained from samples (B), (C) and (D).

Cable Production

A prototype low-voltage cable was made, in which the insulating layer consisted of the composite material according to the present invention (sample (B) obtained as described above).

The cable was prepared by extrusion of the insulating layer, by means of a Bandera 45 mm single-screw extruder in 20 D configuration provided with three zones for heat regulation by using diathermic oil, on a conductor of red copper consisting of a single wire (conductor cross-sectional area: 1.5 mm$^2$; thickness of insulation: 0.7 mm).

The extruder, with internal diameter of 45 mm, had the following temperature profile: from 110° C. to 160° C. in the barrel, 150° C. on the collar and 150° C. in the head and passive temperature of the extrusion screw. The line speed was 25 m/min.

Pieces with a length of 15 mm were obtained from the insulating layer and were used for determining the elastic modulus at elongation and the elongation at break (according to standard CEI 20-34§1.1) with the Instron instrument and with a traction speed of 50 mm/min. The results obtained are presented in Table 4.

Other pieces with a length of 15 mm were obtained from the insulating layer and were used for determining the variation of the dynamic elastic modulus as a function of temperature, using a DMTA analyser (Dynamic Mechanical Thermal Analyzer from Reometrics Inc.), operating as described above. The results obtained are shown in Table 4.

TABLE 4

| ELASTIC MODULUS AT ELONGATION (MPa) | |
|---|---|
| 10% | 3.6 |
| 20% | 4.2 |
| 50% | 5.0 |
| DYNAMIC ELASTIC MODULUS (MPa)/(° C.) | |
| 1000 | −22.0° C. |
| 100 | +29.1° C. |
| 10 | +70.5° C. |
| ELONGATION AT BREAK | 700% |

Thermopressure Tests

A thermopressure test according to standard CEI 20-34/3-1 was carried out on cables produced as described above, in which the insulating layer consisted of the polymer as such (Sample (A)) or of the composite material according to the present invention (Samples (B), (C) and (D)).

For this purpose, three adjacent samples with length of 70 mm were obtained from the aforesaid cables and were submitted to pressure by means of a rectangular blade (edge: 0.7 mm) arranged perpendicularly to the direction of the cable. A force was applied to the blade equal to 1.1 N, obtained from the following formula:

$$F = k \cdot sqrt(2 \cdot D\delta - \delta^2)$$

in which:
k=0.6;
δ=0.7 mm (average value of the thickness of the insulation of the sample);
D=2.8 mm (average value of the outside diameter of the sample).

The test was carried out with the samples maintained at a temperature of 90° C. for 4 hours. At the end, the samples were cooled quickly under load, until a temperature was reached at which elastic recovery of the insulation did not occur, and they were then immersed in cold water.

At the end of cooling, the conductor was extracted from each sample, obtaining samples of tubular shape, from which a strip was removed, perpendicularly to the direction of the blade. For each strip, the depth of the impression left by the blade was measured: the test is considered to have been passed when said impression has a depth not greater than 50% of the thickness of the insulation. The following data were obtained:

the cable with the insulating layer obtained from sample (A) did not pass the test, as the impression was 0.6 mm, equal to 86% of the thickness of the insulation;

the cable with the insulating layer obtained from sample (B) passed the test, as the impression was 0.08 mm, equal to 12% of insulation thickness;

the cable with the insulating layer from sample (C) passed the test, as the impression was 0.07 mm, equal to 10% of insulation thickness.

The aforesaid test was repeated under the same conditions but keeping the samples at a higher temperature: 110° C. instead of 90° C. for 4 hours. The following data were obtained:

the cable with the insulating layer obtained from sample (B) passed the test, as the impression was 0.14 mm, equal to 20% of insulation thickness;

the cable with the insulating layer obtained from sample (C) passed the test, as the impression was 0.11 mm, equal to 15% of insulation thickness;

the cable with the insulating layer obtained from sample (D) passed the test, as the impression was 0.08 mm, equal to 12% of insulation thickness.

Measurements of Insulation Constant

Said cables were submitted to measurement of the insulation constant according to standard CEI 20-20 (CENELEC HD 21.2), by immersing in water, at a temperature of 20° C., samples of cable with a length of 10 m, keeping a 0.25 m section of cable at each end out of the water and applying a continuous voltage between the conductor and the water equal to 500 V/min. The following values of insulation resistance (Ri) were measured:

cable with the insulating layer obtained from sample (A): (Ri)=30 000 MΩ·Km;

cable with the insulating layer obtained from sample (B): (Ri)=30 000 MΩ·Km;

cable with the insulating layer obtained from sample (C): (Ri)=30 000 MΩ·Km.

The insulation constants (Ki) were calculated using the following formula:

$$(Ki) = (Ri)/log(D/d)$$

in which:
D=nominal outside diameter of the insulation;
d=diameter of the ring encircling the conductor.

The following values were obtained:

cable with the insulating layer obtained from sample (A): $(Ki) = 10^5$ MΩ·Km;

cable with the insulating layer obtained from sample (B): $(Ki) = 10^5$ MΩ·Km;

cable with the insulating layer obtained from sample (C): $(Ki) = 10^5$ MΩ·Km.

The above data show that the presence of the inorganic material with lamellar structure does not alter the electrical characteristics of the polymer as such.

EXAMPLE 2

Production of a Composite Material

The composite material was produced by melt blending of:

Vestodur® 3000 (Hüls): polybutylene terephthalate containing 29.06 wt. % oxygen; and Cloisite® 20A (Southern Clay Products): organo-modified montmorillonite (95 meq/100 g) belonging to the smectite family;

in the quantities shown in Table 5.

TABLE 5

| | SAMPLE | | | |
|---|---|---|---|---|
| PRODUCT | (A') | (B') | (C') | (D') |
| VESTODUR ® 3000 | 100 phr | 100 phr | 100 phr | 100 phr |
| CLOISITE ® 20A | — | 5 phr | 10 phr | 20 phr |

Samples (B'), (C') and (D') were prepared in a closed Brabender mixer (volume of mixing chamber: 60 cm³) with volumetric filling coefficient of approx. 97%. In the first stage, the mixer was loaded with the Vestodur® 3000, in the quantities stated above, and this was heated to its softening point (180° C.) for a total time of 2 minutes (speed of the rotors: 50 rev/min). Next, the Cloisite® 20A was added, in the quantities stated above, and the mixture thus obtained was heated to a temperature of 235° C. for a time of 5 minutes (speed of the rotors: 50 rev/min), then at 240° C. for a further 5 minutes (speed of the rotors: 50 rev/min), obtaining the composite material according to the present invention. Sample (A') (pure polymer) was obtained by mixing, in the Brabender mixer indicated above, the Vestodur® 3000, in the quantities indicated above, at a temperature of 240° C. for a total time of 5 minutes (speed of the rotors: 50 rev/min).

Using sample (B'), a film was prepared as described in Example 1. The film thus obtained was submitted to X-ray diffraction analysis using a Philips Xpert diffractometer, obtaining a d-spacing value of 32.8 Å.

Said value, compared with the d-spacing value of Cloisite® 20 A in powder form, which was 24.2 Å, shows that intercalation of the polymer in the organic material had occurred: in fact a 36% change in d-spacing value was obtained.

Cable Production

A prototype low-voltage cable was produced, in which the insulating layer consisted of the composite material according to the present invention (sample (B')).

The cable was prepared by extrusion of the insulating layer, through a Bandera 45 mm single-screw extruder in 20 D configuration provided with three zones for heat regulation by using diathermic oil, on a red copper conductor consisting of a single wire (conductor cross-sectional area: 1.5 $mm^2$; insulation thickness: 0.2 mm).

The extruder, with internal diameter of 45 mm, had the following temperature profile: from 220° C. to 260° C. in the barrel, 260° C. on the collar and 260° C. in the head, and passive temperature of the extrusion screw. The line speed was 25 m/min.

Pieces with a length of 15 mm were obtained from the insulating layer and were used for determining the stress at break and the elongation at break (according to standard CEI 20-34§1.1) with the Instron instrument and at a traction speed of 50 mm/min. The following results were obtained:

stress at break: 70 MPa;

elongation at break: 350%.

Thermopressure Tests

A thermopressure test according to standard CEI 20-43/3-1, as described in Example 1, was carried out on cables produced as described above, in which the insulating layer consisted of the polymer as such (Sample (A')) or of the composite material according to the present invention (Sample (B')).

The aforesaid test was carried out in the same conditions as described in Example 1 but keeping the samples at a higher temperature: 210° C. instead of 90° C., for 4 hours. The following data were obtained:

the cable with the insulating layer obtained from sample (A') did not pass the test, as the impression was 0.14 mm, equal to 70% of insulation thickness;

the cable with the insulating layer obtained from sample (B') passed the test, as the impression was 0.03 mm, equal to 15% of insulation thickness.

EXAMPLE 3

Production of a Composite Material

The composite material (E) was produced by melt blending of:

Elvax® 40L03 (DuPont): ethylene-vinyl acetate copolymer containing 40 wt. % vinyl acetate, 14.87 wt. % oxygen; and Cloisite® 6A (Southern Clay Products): organo-modified modified montmorillonite (140 meq/100 g) belonging to the smectite family;

in the following quantities:

Elvax® 40L03: 100 phr;

Cloisite® 6A: 10 phr;

working in the same conditions described in Example 1.

The film obtained as described in Example 1 was submitted to X-ray diffraction analysis using a Philips Xpert diffractometer, obtaining a d-spacing value of 35 Å.

This value, compared with the d-spacing value of Cloisite® 6A in powder form, which is 35 Å, shows that intercalation of the polymer in the organic material had not occurred.

Thermopressure Tests

A thermopressure test according to standard CEI 20-43/3-1, as described in Example 1, was carried out on a prototype low-voltage cable, obtained as described in Example 1, in which the insulating layer consisted of sample (E).

For comparison, a prototype low-voltage cable was used that had been obtained as described in Example 1 using the mixture given below as material for the insulating coating (sample (F)):

Elvax® 40L03: 100 phr;

calcium carbonate ($CaCO_3$): 10 phr;

said mixture being obtained by working in the same conditions as described in Example 1.

The aforesaid test was carried out in the same conditions as described in Example 1 but keeping the samples at a lower temperature: 70° C. instead of 90° C. for 4 hours. The following data were obtained:

the cable with the insulating layer obtained from sample (E) did not pass the test, as the impression was 0.6 mm, equal to 85% of insulation thickness;

the cable with the insulating layer obtained from sample (F) did not pass the test, as the impression was 0.6 mm, equal to 80% of insulation thickness.

The data given above therefore show that non-intercalation of the polymer in the organic material does not improve the mechanical properties of the cable and that said properties are similar to those found using a simple polymer/mineral filler mixture, known in the art.

EXAMPLE 4

Production of a Composite Material

The composite material was produced by melt blending of:

Riblene® FL30 (EniChem): low-density polyethylene (free from hetero atoms); and

Cloisite® 25A (Southern Clay Products): organo-modified montmorillonite (25 meq/100 g) belonging to the smectite family;

in the quantities stated in Table 6.

TABLE 6

| PRODUCT | SAMPLE | | | |
| --- | --- | --- | --- | --- |
|  | (G) | (H) | (I) | (L) |
| RIBLENE® FL30 | 100 phr | 100 phr | 100 phr | 100 phr |
| CLOISITE® 25A | — | 5 phr | 10 phr | 20 phr |

The samples were prepared in the manner described in Example 1.

The film obtained from sample (I) as described in Example 1 is submitted to X-ray diffraction analysis using a Philips Xpert diffractometer, obtaining a d-spacing value of 20.4 Å.

This value, compared with the d-spacing value of Cloisite® 25A in powder form, equal to 20.4 Å, shows that intercalation of the polymer in the organic material has not occurred.

Measurements of Permeability

Table 7 shows the values of permeability to nitrogen for samples (A), (B), (C), (D), (G), (H), (I) and (L) prepared as described above, which were obtained by working in accordance with the description given in "Permeability of Plastic Films and Coated Papers to Gases and Vapors" (1962), Part 1, p. 1–11, Technical Association of the Pulp and Paper Industry Ed., New York.

TABLE 7

| SAMPLES | PERMEABILITY ncm³/(Pa · s · cm) |
|---|---|
| (A) | $3.20 \times 10^{-13}$ |
| (B) | $1.66 \times 10^{-13}$ |
| (C) | $1.44 \times 10^{-13}$ |
| (D) | $8.39 \times 10^{-14}$ |
| (G) | $1.32 \times 10^{-13}$ |
| (H) | $9.63 \times 10^{-14}$ |
| (I) | $9.22 \times 10^{-14}$ |
| (L) | $8.20 \times 10^{-13}$ |

The data given above show that samples (B), (C) and (D) exhibit a more marked decrease in permeability to nitrogen compared with samples (H), (I) and (L). Note, in particular, sample (B) (containing 5 phr of Cloisite® 25A), which shows a decrease in permeability to nitrogen of approx. 50% with respect to the polymer as such (sample (A)), whereas samples (H), (I) and (L) show a much more constant value of permeability with increase in the concentration of Cloisite® 25A.

What is claimed is:

1. Cable comprising at least one conductor and at least one coating layer based on a composite material comprising:
   at least one polymer containing a predetermined quantity of polar groups; and
   at least one inorganic material with lamellar structure, surface-treated with a predetermined quantity of a compatibilizer;
   in which said predetermined quantity of polar groups and said predetermined quantity of compatibilizer are selected in such a way that said inorganic material exhibits, in the composite material, a d-spacing value in X-ray diffraction analysis at least 20% higher with respect to the d-spacing value of the inorganic material as such.

2. Cable according to claim 1, in which the inorganic material exhibits, in the composite material, a d-spacing value in X-ray diffraction analysis at least 30% higher with respect to the d-spacing value of the inorganic material as such.

3. Cable according to claim 1, in which the polymer containing a predetermined quantity of polar groups is selected from polymers of low polarity having a content of hetero atoms between 0.5 wt. % and 7 wt. % with respect to the weight of the polymer.

4. Cable according to claim 3, in which the polymers of low polarity are polypropylene or polyethylene grafted with maleic anhydride; ethylene-vinyl acetate (EVA) copolymers having a content of vinyl acetate between 2 wt % and 18 wt. %; ethylene ethyl acrylate (EEA) copolymers having a content of ethyl acrylate between 2 wt. % and 18 wt. %; ethylene-methyl acrylate (EMA) copolymers having a content of methyl acrylate between 2 wt % and 21 wt. %; ethylene acrylic acid copolymers; epoxidized natural rubber (ENR); or natural rubber functionalized with acrylic or methacrylic groups.

5. Cable according to claim 1, in which the polymer containing a predetermined quantity of polar groups is selected from polymers of medium polarity having a content of hetero atoms between 7 wt. % and 32 wt. %.

6. Cable according to claim 5, in which the polymers of medium polarity are ethylene-vinyl acetate (EVA) copolymers having a content of vinyl acetate between 18 wt. % and 80 wt. %; ethylene-ethyl acrylate (EEA) copolymers having a content of ethyl acrylate between 18 wt. % and 80 wt. %;
   ethylene-methyl acrylate (EMA) copolymers having a content of methyl acrylate between 21 wt % and 80 wt. %; polymethylmethacrylate (PMMA); polybutylene terephthalate (PBT), polyethylene terephthalate (PET); elastomeric copolyesters obtained by transesterification of terephthalic anhydride with a mixture of diols;
   polyethylene chlorosulphonate (CSP), chlorinated polyethylene; or polyacrylates.

7. Cable according to claim 1, in which the polymer containing a predetermined quantity of polar groups is selected from polymers of high polarity having a content of hetero atoms between 32 wt. % and 50 wt. %.

8. Cable according to claim 7, in which the polymers of high polarity are ethylene-vinyl acetate (EVA) copolymers having a content of vinyl acetate greater than 80 wt. %; ethylene-ethyl acrylate (EAA) copolymers having a content of ethyl acrylate greater than 80 wt. %; ethylene-methyl acrylate copolymers having a content of methyl acrylate greater than 80 wt. %; polyvinyl acetate; polyethyl acrylate; polymethyl acrylate; or polyvinyl chloride (PVC).

9. Cable according to claim 1, in which the inorganic material with lamellar structure is selected from phyllosilicates.

10. Cable according to claim 9, in which the phyllosilicates are selected from smectites; vermiculite; halloisite; sericite; and their mixtures.

11. Cable according to claim 10, in which the smectites are selected from montmorillonite, nontronite, beidellite, volkonskoite, hectorite, saponite, and sauconite.

12. Cable according to claim 11, in which the smectite is montmorillonite.

13. Cable according to claim 1, in which the compatibilizer is selected from quaternary ammonium and phosphonium salts having general formula (I):

in which:
   Y represents N or P;
   $R_1$, $R_2$, $R_3$ and $R_4$, which may be identical or different, represent a linear or branched $C_1$–$C_{20}$ alkyl or hydroxyalkyl group; a linear or branched $C_1$–$C_{20}$ alkenyl or hydroxyalkenyl group; a group —$R_5$—SH or —$R_5$—NH in which $R_5$ represents a linear or branched $C_1$–$C_{20}$ alkylene group; a $C_6$–$C_{18}$ aryl group; a $C_7$–$C_{20}$ arylalkyl or alkylaryl group; or a $C_5$–$C_{18}$ cycloalkyl group, said cycloalkyl group optionally containing a hetero atom selected from oxygen, nitrogen and sulphur;

$X^{n-}$ represents an anion selected from a chloride ion, a sulphate ion and a phosphate ion; and n represents 1, 2 or 3.

14. Cable according to claim 1, in which the inorganic material with lamellar structure is selected from inorganic materials with lamellar structure of low polarity obtained by surface treatment with a predetermined quantity of a compatibilizer having general formula (I) in which at least two of the substituents $R_1$, $R_2$, $R_3$ and $R_4$, represent a linear or branched $C_4$–$C_{20}$ alkyl group, said quantity being between 125 meq and 200 meq per 100 g of inorganic material with lamellar structure.

15. Cable according to claim 13, in which the inorganic material with lamellar structure is selected from inorganic materials with lamellar structure of medium polarity obtained by surface treatment with a predetermined quantity of a compatibilizer having general formula (I) in which at least one of the substituents $R_1$, $R_2$, $R_3$ and $R_4$, represents a linear or branched $C_4$–$C_{20}$ alkyl or hydroxyalkyl group, or a group —$R_5$—SH or —$R_5$—NH in which $R_5$ represents a linear or branched $C_4$–$C_{20}$ alkylene group, said quantity being between 95 meq and 125 meq per 100 g of inorganic material with lamellar structure.

16. Cable according to claim 13, in which the inorganic material with lamellar structure is selected from inorganic materials with lamellar structure of high polarity obtained by surface treatment with a predetermined quantity of a compatibilizer having general formula (I) in which at least one of the substituents $R_1$, $R_2$, $R_3$ and $R_4$, represents a linear or branched $C_4$–$C_{20}$ alkyl or hydroxyalkyl group, or a linear or branched $C_4$–$C_{20}$ alkylenyl or hydroxyalkenyl group, or a group —$R_5$—SH or —$R_5$NH in which $R_5$ represents a linear or branched $C_4$–$C_{20}$ alkylene group, said quantity being between 20 meq and 95 meq per 100 g of inorganic material with lamellar structure.

17. Cable according to claim 13, in which the composite material comprises:

at least one polymer of low polarity having a content of hetero atoms between 0.5 wt. % and 7 wt. %; and at least one inorganic material with lamellar structure of low polarity obtained by surface treatment with a predetermined quantity of a compatibilizer having general formula (I) in which at least two of the substituents $R_1$, $R_2$, $R_3$ and $R_4$, represent a linear or branched $C_4$–$C_{20}$ alkyl group, said quantity being between 125 meq and 200 meq per 100 g of inorganic material with lamellar structure.

18. Cable according to claim 17, in which the polymers of low polarity are polypropylene or polyethylene grafted with maleic anhydride; ethylene-vinyl acetate (EVA) copolymers having a content of vinyl acetate between 2 wt. % and 18 wt. %; ethylene-ethyl acrylate (EEA) copolymers having a content of ethyl acrylate between 2 wt. % and 18 wt. %; ethylene-methyl acrylate (EMA) copolymers having a content of methyl acrylate between 2 wt. % and 21 wt. %; ethylene-acrylic acid copolymers; epoxidized natural rubber (ENR); or natural rubber functionalized with acrylic or methacrylic groups.

19. Cable according to claim 13, in which the composite material comprises:

at least one polymer of medium polarity having a content of hetero atoms between 7 wt. % and 32 wt. %; and at least one inorganic material with lamellar structure of medium polarity obtained by surface treatment with a predetermined quantity of a compatibilizer having general formula (I) in which at least one of the substituents $R_1$, $R_2$, $R_3$ and $R_4$, represents a linear or branched $C_4$–$C_{20}$ alkyl or hydroxyalkyl group, or a group —$R_5$—SH or —$R_5$—NH in which $R_5$ represents a linear or branched $C_4$–$C_{20}$ alkylene group, said quantity being between 95 meq and 125 meq per 100 g of inorganic material with lamellar structure.

20. Cable according to claim 19, in which the polymers of medium polarity are ethylene-vinyl acetate (EVA) copolymers having a content of vinyl acetate between 18 wt. % and 80 wt. %; ethylene-ethyl acrylate (EEA) copolymers having a content of ethyl acrylate between 18 wt. % and 80 wt. %; ethylene-methyl acrylate (EMA) copolymers having a content of methyl acrylate between 21 wt. % and 80 wt. %; polymethylmethacrylate (PMMA); polybutylene terephthalate (PBT), polyethylene terephthalate (PET); elastomeric copolyesters obtained by transesterification of terephthalic anhydride with a mixture of diols;

polyethylene chlorosulphonate (CSP); chlorinated polyethylene; or polyacrylate.

21. Cable according to claim 13, in which the composite material comprises:

at least one polymer of high polarity having a content of hetero atoms between 32 wt. % and 50 wt. %; and at least one inorganic material with lamellar structure of high polarity obtained by surface treatment with a predetermined quantity of a compatibilizer having general formula (I) in which at least one of the substituents $R_1$, $R_2$, $R_3$ and $R_4$, represents a linear or branched $C_4$–$C_{20}$ alkyl or hydroxyalkyl group, or a linear or branched $C_4$–$C_{20}$ alkenyl or hydroxyalkenyl group, or a group —$R_5$—SH or —$R_5$—NH in which $R_5$ represents a linear or branched $C_4$–$C_{20}$ alkylene group, said quantity being between 20 meq and 95 meq per 100 g of inorganic material with lamellar structure.

22. Cable according to claim 21, in which the polymers of high polarity are ethylene-vinyl acetate (EVA) copolymers having a content of vinyl acetate greater than 80 wt. %; ethylene-ethyl acrylate (EAA) copolymers having a content of ethyl acrylate greater than 80 wt. %; ethylene-methyl acrylate copolymers having a content of methyl acrylate greater than 80 wt. %; polyvinyl acetate; polyethyl acrylate; polymethyl acrylate; or polyvinyl chloride (PVC).

23. Cable according to claim 1, in which the inorganic material with lamellar structure is present in a quantity between 1 phr and 40 phr.

24. Cable according to claim 23, in which the inorganic material with lamellar structure is present in a quantity between 4 phr and 20 phr.

25. Cable according to claim 1, which comprises at least one coating layer with electrical insulation properties.

26. Cable according to claim 1, which comprises at least one coating layer with semiconducting properties.

27. Cable according to claim 1, which comprises at least one coating layer having a function of outer protective sheath.

28. Composite material comprising:

at least one polymer containing a predetermined quantity of polar groups; and at least one inorganic material with lamellar structure surface-treated with a predetermined quantity of a compatibilizer, wherein said at least one inorqanic material is present in a quantity between 1 phr and 40 phr;

in which said predetermined quantity of polar groups and said predetermined quantity of compatibilizer are selected in such a way that said inorganic material displays, in the composite material, a d-spacing value in X-ray diffraction analysis at least 20% higher with respect to the d-spacing value of the inorganic material as such.

29. Composite material according to claim 28, in which the inorganic material displays, in the composite material, a d-spacing value in X-ray diffraction analysis at least 30% higher with respect to the d-spacing value of the inorganic material as such.

30. Composite material according to claim 28, wherein the polymer containing a predetermined quantity of polar groups is selected from polymers of low polarity having a content of hetero atoms between 0.5 wt. % and 7 wt. % with respect to the weight of the polymer.

31. Composite material according to claim 30, wherein the polymers of low polarity are polypropylene or polyethylene grafted with maleic anhydride; ethylene-vinyl acetate (EVA) copolymers having a content of vinyl acetate between 2 wt. % and 18 wt. %; ethylene-ethyl acrylate (EEA) copolymers having a content of ethyl acrylate between 2 wt. % and 18 wt. %; ethylene-methyl acrylate (EMA) copolymers having a content of methyl acrylate between 2 wt. % and 21 wt. %; ethylene-acrylic acid copolymers; epoxidized natural rubber (ENR); or natural rubber functionalized with acrylic or methacrylic groups.

32. Composite material according to claim 28, wherein the polymer containing a predetermined quantity of polar groups is selected from polymers of medium polarity having a content of hetero atoms between 7 wt. % and 32 wt. %.

33. Composite material according to claim 32, wherein the polymers of medium polarity are ethylene-vinyl acetate (EVA) copolymers having a content of vinyl acetate between 18 wt. % and 80 wt. %; ethylene-ethyl acrylate (EEA) copolymers having a content of ethyl acrylate between 18 wt. % and 80 wt. %; ethylene-methyl acrylate (EMA) copolymers having a content of methyl acrylate between 21 wt. % and 80 wt. %; polymethylmethacrylate (PMMA); polybutylene terephthalate (PBT), polyethylene terephthalate (PET); elastomeric copolyesters obtained by transesterification of terephthalic anhydride with a mixture of diols; polyethylene chlorosulphonate (CSP); chlorinated polyethylene; or polyacrylates.

34. Composite material according to claim 30, wherein the polymer containing a predetermined quantity of polar groups is selected from polymers of high polarity having a content of hetero atoms between 32 wt. % and 50 wt. %.

35. Composite material according to claim 34, wherein the polymers of high polarity are: ethylene-vinyl acetate (EVA) copolymers having a content of vinyl acetate greater than 80 wt. %; ethylene-ethyl acrylate (EAA) copolymers having a content of ethyl acrylate greater than 80 wt. %; ethylene-methyl acrylate copolymers having a content of methyl acrylate greater than 80 wt. %; polyvinyl acetate; polyethyl acrylate; polymethyl acrylate; or polyvinyl chloride (PVC).

36. Composite material according to claim 28, wherein the inorganic material with lamellar structure is selected from phyllosilicates.

37. Composite material according to claim 36, wherein the phyllosilicates are selected from smectites; vermiculite; halloisite; sericite; and their mixtures.

38. Composite according to claim 37, wherein the smectites are selected from montmorillonite, nontronite, beidellite, volkonskoite, hectorite, saponite, and sauconite.

39. Composite according to claim 38, wherein the smectite is montmorillonite.

40. Composite according to claim 28, wherein the compatibilizer is selected from quaternary ammonium and phosphonium salts having general formula (I):

in which:

Y represents N or P;

$R_1$, $R_2$, $R_3$ and $R_4$, which may be identical or different, represent a linear or branched $C_1$–$C_{20}$ alkyl or hydroxyalkyl group; a linear or branched $C_1$–$C_{20}$ alkenyl or hydroxyalkenyl group; a group —$R_5$—SH or —$R_5$—NH in which $R_5$ represents a linear or branched $C_1$–$C_{20}$ alkylene group; a $C_6$–$C_{18}$ aryl group; a $C_7$–$C_{20}$ arylalkyl or alkylaryl group; or a $C_5$–$C_{18}$ cycloalkyl group, said cycloalkyl group optionally containing a hetero atom selected from oxygen, nitrogen and sulphur;

$X^{2-}$ represents an anion selected from a chloride ion, a sulphate ion and a phosphate ion; and n represents 1, 2 or 3.

41. Composite material according to claim 28, wherein the inorganic material with lamellar structure is present in a quantity between 4 phr and 20 phr.

* * * * *

UNITED STATES PATENT AND TRADEMARK OFFICE
CERTIFICATE OF CORRECTION

PATENT NO. : 6,740,396 B2
DATED : May 25, 2004
INVENTOR(S) : Antonio Carrus et al.

It is certified that error appears in the above-identified patent and that said Letters Patent is hereby corrected as shown below:

Column 19,
Line 3, "$X^n$" should read -- $X^{n-}$ --.
Line 34, "-$R_5NH$" should read -- -$R_5$-NH --.

Column 20,
Line 63, "inorqanic" should read -- inorganic --.

Column 21,
Line 45, "claim 30," should read -- claim 28, --.

Column 22,
Line 43, "$X^{2-}$" should read -- $X^{n-}$ --.

Signed and Sealed this

Twelfth Day of October, 2004

JON W. DUDAS
*Director of the United States Patent and Trademark Office*